United States Patent
Subramanyam et al.

(10) Patent No.: US 9,724,670 B2
(45) Date of Patent: Aug. 8, 2017

(54) WATER ABSORBENT POLYMERS AND A PROCESS FOR THEIR PREPARATION

(71) Applicant: Reliance Industries Limited, Mumbai (IN)

(72) Inventors: Elango Subramanyam, Salem (IN); Manjeet Singh Choudhary, Vadodara (IN); Raksh Vir Jasra, Gujarat (IN); Ashishkumar Indravadan Parekh, Vadodara (IN); Pralhad Ambadas Ganeshpure, Vadodara (IN); Padmavathi Garimella, Visakhapatanam (IN); Jayesh Prafullachandra Vora, Mumbai (IN)

(73) Assignee: Reliance Industries Limited, Mumbai (IN)

(*) Notice: Subject to any disclaimer, the term of this patent is extended or adjusted under 35 U.S.C. 154(b) by 0 days.

(21) Appl. No.: 15/106,160

(22) PCT Filed: Dec. 22, 2014

(86) PCT No.: PCT/IN2014/000790
§ 371 (c)(1),
(2) Date: Jun. 17, 2016

(87) PCT Pub. No.: WO2016/056019
PCT Pub. Date: Apr. 14, 2016

(65) Prior Publication Data
US 2016/0318001 A1    Nov. 3, 2016

(30) Foreign Application Priority Data
Dec. 20, 2013   (IN) .................. 4001/MUM/2013

(51) Int. Cl.
*C08F 2/00*         (2006.01)
*C08F 20/06*        (2006.01)
(Continued)

(52) U.S. Cl.
CPC .......... *B01J 20/261* (2013.01); *B01J 20/267* (2013.01); *B01J 20/28016* (2013.01);
(Continued)

(58) Field of Classification Search
CPC .. B01J 20/261; B01J 20/267; B01J 20/28016; B01J 20/3028; C08F 6/14; C08F 2/14; C08F 2/32; C08F 220/06; C08F 2/08
(Continued)

(56) References Cited

U.S. PATENT DOCUMENTS 4,076,663 A    2/1978  Masuda et al.
4,446,261 A    5/1984  Yamasaki et al.
(Continued)

FOREIGN PATENT DOCUMENTS

JP    S56-161408 A    12/1981
JP    S57-158209 A     9/1982
JP    S57-198714 A    12/1982

OTHER PUBLICATIONS

International Search Report issued in PCT/IN2014/000790 mailed on Jul. 23, 2015 (2 pages).
(Continued)

*Primary Examiner* — William Cheung
(74) *Attorney, Agent, or Firm* — Osha Liang LLP

(57) ABSTRACT

Water absorbent polymers and a process for their preparation are disclosed. The process for preparing water absorbent polymers comprises preparing a slurry with relatively high amounts of polymer particles (in the range of 40 to 55 wt % of the total mass of the slurry) having water absorbed therein. The slurry is then directly spray dried to obtain water absorbent polymers.

11 Claims, 1 Drawing Sheet

(51) Int. Cl.
- *C08F 118/02* (2006.01)
- *B01J 20/26* (2006.01)
- *C08F 2/08* (2006.01)
- *C08F 2/14* (2006.01)
- *C08F 2/32* (2006.01)
- *C08F 6/14* (2006.01)
- *B01J 20/28* (2006.01)
- *B01J 20/30* (2006.01)
- *C08F 220/06* (2006.01)

(52) U.S. Cl.
CPC .............. *B01J 20/3028* (2013.01); *C08F 2/08* (2013.01); *C08F 2/14* (2013.01); *C08F 2/32* (2013.01); *C08F 6/14* (2013.01); *C08F 220/06* (2013.01)

(58) Field of Classification Search
USPC ........................................ 526/89, 317.1, 319
See application file for complete search history.

(56) References Cited

U.S. PATENT DOCUMENTS

| | | | |
|---|---|---|---|
| 6,562,879 B1* | 5/2003 | Hatsuda | C08J 3/12 241/24.28 |
| 6,600,011 B2 | 7/2003 | McDonnell et al. | |
| 2001/0025093 A1* | 9/2001 | Ishizaki | C08J 3/12 526/210 |
| 2002/0165341 A1 | 11/2002 | Weitzel | |
| 2003/0078366 A1 | 4/2003 | McDonnell et al. | |
| 2010/0234233 A1 | 9/2010 | Sannino et al. | |
| 2011/0059329 A1* | 3/2011 | Dobrawa | A61L 15/60 428/522 |
| 2012/0085971 A1* | 4/2012 | Daniel | A61L 15/60 252/194 |

OTHER PUBLICATIONS

Written Opinion of the International Searching Authority issued in PCT/IN2014/000790 mailed on Jul. 23, 2015 (5 pages).

\* cited by examiner

WATER ABSORBENT POLYMERS AND A PROCESS FOR THEIR PREPARATION

RELATED APPLICATIONS

This application is a National Stage Entry of International Application No. PCT/IN2014/000790, filed Dec. 22, 2014, and claims the benefit of and priority to India Application No. 4001/MUM/2013, filed Dec. 20, 2013, all of which are incorporated herein by reference in their entirety.

FIELD OF THE DISCLOSURE

The present disclosure relates to water absorbent polymers and a process for their preparation.

BACKGROUND

The exceptional hydrophilic nature of water absorbent polymers (hydrogels or superabsorbent polymers (SAPs)) makes them an ideal absorbent material that is useful for absorbing a wide range of fluids. Water absorbent polymers are capable of absorbing and retaining around hundred to thousand times of their weight of water. Due to excellent absorption and retention capacity, water absorbent polymers are used in a wide range of applications such as personal disposable hygiene products, for example, diapers, sanitary napkins and the like, candles, fragrance carriers, cooling gel packs, communication cables, water retention agents in horticulture and even as artificial snow in motion pictures and stage shows.

EXISTING KNOWLEDGE

The process for preparation of water absorbent polymers is well known in the art. On a commercial scale, water absorbent polymers are manufactured by bulk, solution, suspension (water-in oil type suspension or inverse suspension polymerization) or emulsion polymerization processes.

U.S. Pat. No. 4,076,663 suggests a solution polymerization process for preparing starch grafted acrylic acid polymer. In the solution polymerization process, monomers are polymerized in water to produce a high viscosity gel which is extruded in the form of strands and films, and dried to remove the aqueous solvent. The dried polymer is then ground to obtain water absorbent polymer particles. Since, the solution polymerization process is carried out by using water as a medium, the water absorbent polymers absorb large volumes of water, which is removed by employing suitable methods such as drying and the like.

United States Patent Publication No. 20100234233 also suggests a solution polymerization process for preparing water absorbent polymer hydrogel in which an aqueous solution comprising at least one hydrophilic polymer is cross-linked by using polycarboxylic acid as a cross-linking agent. The resultant polymer gel is washed with water and/or polar organic solvent and dried in an oven.

Further, inverse phase suspension polymerization process for preparing water absorbent polymers has also been suggested, for example, in Japan Patent Publication Nos. S56-161408, S57-158209 and S57-198714. In the process as recited in the Japan Publication No S57-198714, water absorbent polymer hydrogel is prepared by water-in-oil type reverse phase suspension polymerization of an α, β-unsaturated carboxylic acid/or its alkali metal salts in the presence of a dispersing agent and a cross-linking agent. The water present in the slurry is removed by azeotropic distillation with an organic solvent, for example, hexane. The remaining water is further removed by drying.

U.S. Pat. No. 4,446,261 also suggests a process for preparing high water absorbent polymers by using a water-in-oil suspension polymerization process. In this process, an aqueous solution of water soluble monomers such as ethylenically unsaturated monomer containing a small amount of a cross-linking agent is dispersed and suspended in a dispersion medium of a hydrocarbon or a halogenated hydrocarbon in the presence of a water soluble free radical initiator to form a water absorbent polymer.

The hitherto described known processes for preparing water absorbent polymers usually comprise the method steps of preparing the polymer, separating the polymer from the slurry, drying the polymer to remove excess water and grinding the dried polymer to obtain water absorbent polymer particles. The water absorbent polymer is usually separated from the slurry by using conventional methods, such as filtration, centrifugation and the like. The water absorbent polymer separated from the slurry is usually dried by using methods such as drum drying, pedal drying, tray drying, vacuum drying and the like. These conventional methods are however allied with disadvantages such as yellowing of polymers, presence of contaminants such as residual monomers, oligomers and the like. Further, the removal of excess water from the water absorbent polymers makes the process energy intensive. Another major disadvantage identified in the above described processes is the grinding of the water absorbent polymer gel to produce water absorbent particles of uniform size. However, in addition to producing water absorbent polymer particles of the desired size, grinding of the water absorbent polymer also produces very fine polymer particles which are undesirable due to their poor fluid absorbency.

U.S. Pat. No. 6,600,011 suggests a method for purifying and drying the polymer hydrogel wherein the polymer hydrogel is washed with a water wash medium until the resulting slurry comprising the hydrogel and wash water medium shows a substantial reduction of unreacted monomers, oligomers and other contaminants. The resultant slurry comprising the polymer hydrogel and the wash water medium is then spray dried. The resultant slurry comprises large quantities of water (80 to 98 wt %) and relatively less amounts of solid polymer hydrogel (2-20 wt %). Since, the process as suggested in the aforementioned US patent involves spray drying of slurry comprising lesser amounts of solid polymer hydrogel, the process is energy intensive and less efficient in terms of time and cost.

Therefore, there is felt a need to provide a process for preparing water absorbent polymers wherein the disadvantages of the above described processes are reduced.

DEFINITIONS

The term 'inverse suspension polymerization' in the context of the present disclosure refers to a polymerization process wherein water soluble monomers are dispersed in the form of droplets in a non-aqueous phase and are polymerized within the droplets in the presence of water soluble cross-linking agents and free radical initiators.

The term 'Absorbency under load (AUL)' in the context of the present disclosure refers to the ability of water absorbent polymer particles of the present disclosure to absorb 0.9% NaCl solution (saline) against a pressure of 0.3 psi. The absorbency under load is measured in accordance with a test method described in European Disposable and Non-Woven Association (EDANA-442-1-99).

The term 'vortex time' of water absorbent polymer particles in the context of the present disclosure refers to the rate of absorption of water absorbent polymer particles in saline.

The term "ASTM D7481-09 method" in the context of the present disclosure refers to the standard test method for determining loose and tapped bulk densities of powders.

OBJECTS

Some of the objects of the present disclosure are described herein below:

It is an object of the present disclosure to ameliorate one or more problems of the prior art or to at least provide a useful alternative.

Another object of the present disclosure is to provide a process for preparing water absorbent polymer particles.

Still another object of the present disclosure is to provide a very simple process for preparing water absorbent polymer particles wherein the various process steps involved in the conventional processes for preparing water absorbent polymers such as multiple washing steps, drying and grinding of water absorbent polymers are obviated.

Still another object of the present disclosure is to provide an economic and energy efficient process for preparing water absorbent polymer particles wherein the slurry is of high concentration i.e. the slurry comprising relatively high amounts of polymer particles is subjected to spray drying.

Yet another object of the present disclosure is to provide a process for preparing water absorbent polymers that provide water absorbent polymer particles with uniform particle size distribution, high absorbency value and with high purity.

Other objects and advantages of the present disclosure will be more apparent from the following description when read in conjunction with the accompanying figure, which are not intended to limit the scope of the present invention.

SUMMARY

In accordance with the present disclosure, there is provided a process for preparing water absorbent polymers, said process comprising the following steps:
  i. preparing by inverse suspension polymerization, a slurry comprising polymer particles having water absorbed therein, wherein said polymer particles are present in an amount ranging between 40% and 55% of the total mass of the slurry;
  ii. homogenising the slurry with the help of heat and stirring, to obtain a homogeneous slurry; and
  iii. spray drying the homogeneous slurry in a spray drier to obtain water absorbent polymer particles.

The method step of preparing the slurry comprises the following steps:
  a. partially neutralizing an aqueous monomer solution of a pre-determined concentration by an alkali solution of a pre-determined concentration, to obtain a partially neutralized aqueous monomer solution;
  b. adding a pre-determined weight proportion of at least one cross-linking agent and at least one free radical initiator to the partially neutralized aqueous monomer solution, to obtain a resultant mixture;
  c. mixing at least one organic solvent with at least one dispersing agent under continuous stirring, at a pre-determined temperature, to obtain a non-aqueous mixture; and
  d. dispersing said resultant mixture drop by drop into the non-aqueous mixture under continuous stirring at a temperature ranging from 55 to 110° C. for a time period varying from 60 to 180 minutes to obtain the slurry.

The monomer can be at least one monomer selected from the group consisting of acrylic acid, methacrylic acid, sodium acrylate, potassium acrylate and acrylamide.

The cross-linking agent can be at least one compound selected from the group consisting of N,N'-methylenebisacrylamide, ethylene glycol diacrylate, polyethylene glycol diacrylate, ethylene glycol dimethacrylate, polyethylene glycol dimethacrylate, glycerol triacrylate, glycerol trimethacrylate, trimethylolpropane trimethacrylate, trimethylolpropane triacrylate and triglycol diacrylate.

The free radical initiator can be at least one selected from the group of compounds consisting of potassium persulfate, sodium persulfate, ammonium persulfate, alkali metal salts, sulfites, thiosulfates, ascorbates, ferrites or combinations thereof.

The organic solvent can be at least one solvent selected from the group consisting of cyclohexane, N-hexane, heptanes, pentane, and toluene.

Typically, the slurry in method step (ii) is heated to a temperature ranging between 40° C. and 50° C. under constant stirring.

Typically, the inlet and outlet temperature of the spray drier is in the range of 110 to 220° C. and 70 to 120° C., respectively.

The spray drying of the homogeneous slurry can be carried out with a feed rate varying between 0.5 to 1.5 kg/hr, aspirator speed varying between 1300 and 2800 rpm, and under vacuum varying between −70 and −170 mm of water.

The spray drying of the homogeneous slurry can be carried out using nitrogen as a drying medium.

The water absorbent polymer obtained can be a copolymer.

The water absorbent polymer obtained can be a graft copolymer.

In accordance with the present disclosure there is provided a water absorbent polymer prepared in accordance with the process of the present disclosure, characterized in that said water absorbent polymer exhibits a bulk-density of at least 0.69 g/cc as measured by ASTM D7481-09 method.

DETAILED DESCRIPTION

Figure 1A:
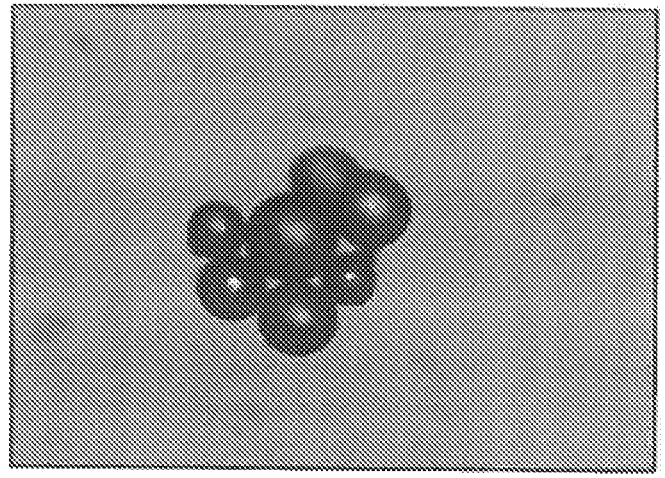
FIG. 1(A) illustrates Polarized Optical Microscopy image of spray dried water absorbent polymer particles (examples-1)

The disadvantages associated with the conventional methods for preparing water absorbent polymers are overcome in the present disclosure by providing a process for preparing water absorbent polymers wherein a slurry comprising relatively high amounts of polymer particles is prepared and directly spray dried to obtain water absorbent polymer particles which have uniform particle size distribution and have very low residual contaminants such as unreacted monomers, soluble oligomer and the like.

The process for preparing water absorbent polymers in accordance with the present disclosure comprises the steps of preparing a slurry having polymer particles in an amount of at least 40% by weight of the total mass of the slurry wherein said polymer particles have water absorbed therein, and subsequently spray drying the slurry to obtain water absorbent polymer particles.

As stated earlier, spray drying of a slurry/suspension/emulsion/any other bulk material comprising relatively low solid content involves high-cost, for example the process for drying polymer hydrogel as suggested in U.S. Pat. No. 6,600,011, which is cost intensive. The inventors of the present disclosure have therefore provided an economic alternative for preparing water absorbent polymer particles wherein the slurry comprising relatively high amounts of polymer particles suspended in a non-aqueous phase is prepared and subsequently dried by using a spray drying process. The slurry containing relatively high amounts of polymer particles is obtained by an inverse suspension polymerization process wherein the polymer particles formed absorb all the water taken initially to conduct the inverse suspension polymerization reaction and therefore comprise water absorbed therein.

The inverse suspension polymerization process for preparing water absorbent polymers is a well-known process and may be accomplished by using any conventional methods known in the prior-art. However, the particular preferred process for preparing the slurry by inverse suspension polymerization in accordance with the present disclosure is described as follows:

A water soluble monomer is dissolved in an aqueous medium. Examples of water soluble monomers suitable for the process of the present disclosure include at least one monomer selected from the group consisting of acrylic acid, methacrylic acid, sodium acrylate, potassium acrylate and acrylamide. The water soluble monomer and the aqueous medium are typically mixed in a pre-determined weight proportion. The aqueous monomer solution is partially neutralized by an alkali solution. The alkali solution suitable for the process of the present disclosure is sodium hydroxide solution. To the partially neutralized aqueous monomer solution, pre-determined weight proportions of a cross-linking agent and a free-radical initiator are added. The cross-linking agent and the free radical initiator used in the process of the present disclosure are water soluble and may be selected from the group of compounds conventionally known in the related prior-art. However, in accordance with one of the exemplary embodiments of the present disclosure, the water soluble cross-linking agent includes at least one compound selected from the group consisting of N,N'-methylenebisacrylamide, ethylene glycol diacrylate, polyethylene glycol diacrylate, ethylene glycol dimethacrylate, polyethylene glycol dimethacrylate, glycerol triacrylate, glycerol trimethacrylate, trimethylolpropane trimethacrylate, trimethylolpropane triacrylate and triglycol diacrylate.

In accordance with one of the exemplary embodiments of the present disclosure, the free radical initiator includes at least one initiator selected from the group consisting of potassium persulfate, sodium persulfate, ammonium persulfate, alkali metal salts and redox initiators. Examples of redox initiator suitable for the purpose of the present disclosure include sulfites, thiosulfates, ascorbates, ferrites and combinations thereof. The cross-linking agent and the free radical initiator are added under nitrogen bubbling. The nitrogen bubbling is typically accomplished until a clear resultant solution is obtained.

In a separate process step, a non-aqueous phase is prepared. For this, a pre-determined weight proportion of an organic solvent is mixed with at least one dispersant under continuous stirring. The dispersant is usually added in an amount sufficient to stabilize the water absorbent polymer particles formed during the polymerization process. The dispersant used in the process of the present disclosure may be selected from any of the compounds conventionally known in the prior-art. In accordance with one of the exemplary embodiments of the present disclosure, the dispersant includes at least one compound selected from the group consisting of sorbitan monostearate, monolaurate, stearyl sodium phthalate, sucrose, fatty acid esters, fatty amine modified clay, ethyl cellulose, silica and modified polylaurylmethacrylate.

In the next process step, the clear resultant solution is dispersed as droplets in the non-aqueous phase. While dispersing, the temperature of the non-aqueous phase is typically maintained in the range of 30 to 80° C. Once the resultant solution is fully dispersed, the temperature is further increased to 80 to 110° C. and maintained for a time period in the range of 60 to 180 minutes to obtain a slurry. The monomers present in the dispersed droplets polymerize within the droplets and provide water absorbent polymer particles dispersed in the non-aqueous phase. As soon as the water absorbent polymer starts to form within the dispersed droplet of the resultant solution, the polymer starts absorbing water present within the dispersed droplet and at the end of the polymerization reaction results into the formation of polymer particle having water absorbed therein. The amount of absorbed water within the polymer particle is equivalent to the amount of water present in the droplet. The slurry prepared in accordance with the process of the present disclosure therefore comprises polymer particles dispersed in the non-aqueous phase wherein the polymer particles comprises water absorbed therein. The amount of polymer particles in the slurry ranges between 40% and 70% by weight of the total mass of the slurry.

The process in accordance with the present disclosure further comprises a method step of separating and drying the water absorbent polymer particles. For the purpose of separating and drying the water absorbent polymer particles, the inventors of the present disclosure advantageously use a spray drying process.

The spray drying of slurry containing high solid content of polymer particles is usually difficult due to high pressure drop and subsequent blocking of the pipelines and process vessels. Since, the slurry prepared in accordance with the process of the present disclosure is highly concentrated slurry, the inventors of the present disclosure therefore use a spray drier wherein the process pipes are appropriately designed to avoid pressure drop and subsequent clogging. The process pipes of the spray drier in accordance with the process of the present disclosure refer to a feed pipe interconnecting a feed tank and an atomizer.

The slurry prepared in accordance with the process of the present disclosure is introduced into a feed tank. Since, the slurry of the present disclosure is highly concentrated, in order to maintain its consistency and to make it easily pumpable, it is heated to a pre-determined temperature under continuous stirring. For this, the feed tank is provided with at least one stirrer and at least one heating device. The stirrer as employed in the process of the present disclosure may be an overhead stirrer or a magnetic stirrer. In the feed tank, the slurry is typically heated to a temperature ranging between 40° C. and 50° C. under constant stirring to obtain a homogeneous slurry. The homogeneous slurry is then pumped to a spray drier through a feed pipe interconnecting the feed tank and the spray drier.

In order to facilitate the pumping of the highly concentrated slurry, the inventors of the present disclosure advantageously use a feed pipe of shorter length as compared to the feed pipes used in the conventional spray drying process. In accordance with one of the exemplary embodiments of the present disclosure, the feed-pipe has a length ranging from 50 to 150 cm. In order to further facilitate the pumping of the homogeneous slurry to the spray drier, the feed pipe is provided with a peristaltic pump.

The homogenous slurry in accordance with the present disclosure is then sprayed through an atomizer and dried under hot gas flow to obtain water absorbent polymer particles. The homogeneous slurry is typically sprayed through an atomizer having nozzle size ranging between 0.7 mm and 1.5 mm. The inlet and outlet temperature of the spray drier is typically maintained in the range of 70 to 220° C. and 70 to 140° C., respectively. The other operating conditions during the spray drying of the homogenous slurry are as follows: feed rate: 0.5 to 1.5 kg/hr; aspirator speed: 1300 to 2800 rpm; vacuum: −70 to −170 mm of water, and nitrogen as a drying medium.

Unlike the process as suggested in U.S. Pat. No. 6,600,011, the process in accordance with the present disclosure directly spray dries the slurry and obviates a method step of washing the slurry before spray drying. The polymer and the process for preparation thereof as suggested in U.S. Pat. No. 6,600,011 is distinctly different from the process of the present disclosure, therefore the method step of washing the slurry in accordance with the present disclosure is neither feasible nor required before spray drying.

Further, the water absorbent polymer particles prepared in accordance with the process of the present disclosure have a very high water absorption capacity, for example, 1 g of the water absorbent polymer particles of the present disclosure is capable of absorbing 500 to 1000 g of water.

The water absorbent polymer particles prepared in accordance with the process of the present disclosure are further characterized for their particle size distribution, absorbency values, bulk density, and vortex time properties. The absorbency values of water absorbent polymer particles of the present disclosure are as follows: 378 g/g water, 73 g/g saline and 27 g/g saline under pressure.

The moisture content of the water absorbent polymer particles of the present disclosure is also analyzed and is found to be around 10%. The moisture contents are analyzed according to a procedure laid down by European Disposable and Non-Woven Association. The particle size distribution of the water absorbent polymer particles of the present disclosure measured by various sieve meshes is found to be as follows: 19.31, 29.31 and 22.79 (>500µ); 56.78, 55.89 and 71.57 (180-500µ) and 24.59, 14.79 and 5.63 (<180µ). The bulk density of the water absorbent polymer particles of the present disclosure, as measured by ASTM D7481-09 method, is found to be 0.69±0.01 g/cc at room temperature. The vortex time of the water absorbent polymer particles of the present disclosure is found to be around 35 seconds.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

EXAMPLE 1

This example describes a process for preparing water absorbent polymer in accordance with the present disclosure.

Step-1: Preparation of the Phase (Oil Phase)

Cyclohexane (400 ml) and a sorbitan monostearate (3.75%) were taken in a reaction kettle equipped with an overhead stirrer, reflux condenser and thermal sensor. The obtained solution mixture was heated to the desired temperature (~55° C.) under gentle stirring and was degassed for 15 to 30 minutes using nitrogen gas.

Step-2: Preparation of the Dispersed Phase (Aqueous Monomer Solution)

Aqueous acrylic acid (~47%) solution was partially neutralized (75%) by drop-wise addition of a sodium hydroxide solution (35% w/w) under magnetic stirring. The neutralization was performed under ice-cold conditions. Afterwards, 0.15 gm of N, N'-methylenebisacrylamide as a water soluble cross-linking agent and potassium persulphate solution (1.5% w/w) as a free-radical initiator were added to the partially neutralized acrylic acid solution under nitrogen bubbling until a clear resultant solution was obtained.

Step-3: Polymerization

The aqueous monomer solution as prepared in method step-2 was added drop-wise to the phase prepared in method step-1. The dispersion was carried out at around 55° C. under continuous agitation with agitation speed of 180-400 rpm. The reaction temperature was increased to 80° C. and maintained for 60-180 minutes once the monomer addition was complete. The slurry thus obtained was cooled to room temperature. The obtained slurry comprised 41 wt % of solid polymer particles having water absorbed therein.

Step-4: Spray Drying of the Slurry:

The obtained slurry was spray dried to obtain pure and dried water absorbent polymer particles. The spray drying was carried out by using any laboratory scale spray drier. The slurry prepared in step (3) was transferred to a feed tank and heated to a temperature of 40° C. under continuous stirring. From the feed tank, the slurry was pumped to a spray drier through a feed pipe having a length of 40 cm. The pumping of the slurry was further facilitated by using a peristaltic pump configured in the feed-pipe. In the spray drier, the slurry was sprayed through an atomizer having a nozzle size of 0.7 to 1.5 mm. The inlet and outlet temperature of the spray drier was maintained at 70 to 220° C. and 70 to 140° C., respectively. Nitrogen gas was used a drying medium. Other process conditions during the spray drying were maintained as follows: feed rate: 55 rpm; aspirator speed: 2000 rpm; and vacuum: −170 mm of water.

EXAMPLE-2

This example described a process for preparing water absorbent polymer wherein water absorbent polymer is dried by using conventional drying methods.

The slurry was prepared in the same manner as described in Example-1. The slurry was decanted and filtered through the Buckner funnel using a vacuum pump. The water absorbent polymer obtained after filtration was subjected to drying in an air draft oven at 100-150° C. for 2-8 hrs. The dried polymer gel was ground using a laboratory hammer mill and sieved to get the particle size from 180-850 microns.

EXAMPLE-3

The slurry prepared in step (3) was transferred to a feed tank and heated to a temperature of 40° C. under continuous stirring. From the feed tank, the slurry was pumped to a spray drier through a feed pipe having a length of 150 cm. The pumping of the slurry was further facilitated by using a peristaltic pump configured in the feed-pipe. Initially the slurry could be spray dried for a few minutes, but the feed pipe got choked due to clogging of the slurry and the spray drying got suspended. This was due to the long length of the feed pipe.

Figure 1B:
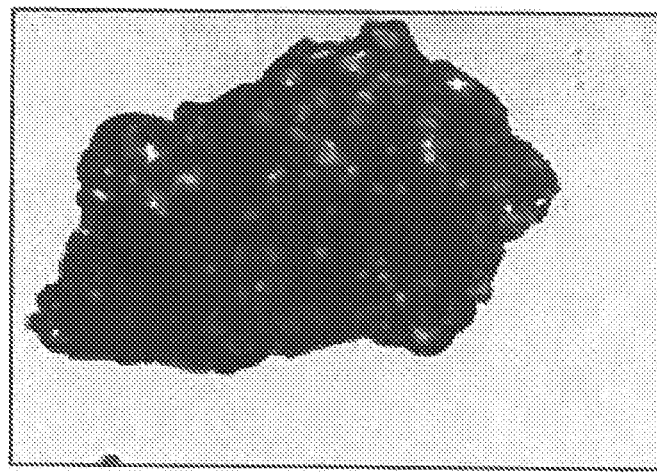
FIG. 1(B) illustrates a Polarized Optical Microscopy image of air dried water absorbent polymer particles (example-2).

The water absorbent polymer particles as obtained in examples-1 and 2 are characterized by using a Polarized Optical Microscope (POM). Polarized Optical Microscope images as provided in FIGS. 1(A) and 1(B) clearly indicate that in case of examples 2 (see FIG. (1B)), water absorbent polymer particles are attached together along with the dispersant, as incase of direct drying dispersant remains in the polymer particles thereby decreasing absorbency under load (AUL) around 75%. Whereas in the process of present disclosure as given in example-1 (see FIG. (1A)), dispersant is removed during spray drying and the water absorbent polymer particles remains un-agglomerated. The un-agglomerated form of water absorbent polymer particles of the present discourse demonstrates increased absorbency under load (AUL) i.e. around 100% absorbency under load (AUL).

Test Methods:

1. Absorbency Capacity in Water/Saline:

Water absorbent polymer particles of example-1 (~0.2 g) was weighed precisely and poured in a large excess (300 ml) of distilled water/saline (0.9% NaCl solution) and allowed to stand for 30 minutes at room temperature. The slurry was stirred occasionally with a glass rod. The amount of water/saline absorbed by the water absorbent polymer particles was determined gravimetrically after the swelling equilibrium reached (30 minutes). Then the slurry was filtered through 100 micron mesh wire sieve. The water/saline absorbency (Q) was determined by weighing the swollen water absorbent polymer particles and calculated according to the following relationship:

$$Q(g/g) = (W_2 - W_1)/W_1$$

$W_2$ = Weight of the swollen water absorbent polymer particles $W_1$ = Weight of the dried water absorbent polymer particles 2. Absorbency Under Load (AUL):

AUL test measures the swelling capacity of the water absorbent polymer particles under moderate pressure. A porous filter plate was placed in a Petri dish and saline was added till the liquid level was equal to the tip of the filter plate and allowed to wet with the saline. Dry water absorbent polymer particles of example-1 (~0.9 g) was weighed precisely and scattered uniformly onto the filter screen test device, a Plexiglas cylinder with 400 mesh SS cloth at the bottom of the cylinder. The piston was put on the dry water absorbent polymer particles while it can be freely slipped in a Plexiglas cylinder. The desired load was placed on the piston to achieve 0.3 psi pressure. Then the whole set was weighed and it was placed on the filter plate. After 60 minutes, the swollen water absorbent polymer particles were weighed again, and AUL was calculated using the following equation:

$$AUL(g/g) = (W_3 - W_2)/W_1$$

$W_1$ = Weight of dried water absorbent polymer particles;

$W_2$ = Weight of dried water absorbent polymer particles & weight of the piston and cylinder; and $W_3$ = Weight of the swollen water absorbent polymer particle with the piston and cylinder.

3. Vortex Time:

The vortex time of water absorbent polymer particles of the present disclosure is measured as follows:

The vortex test measures the amount of time in seconds required for 1 gram of a water absorbent polymer particles to arrest a vortex created by stirring 50 ml of saline solution at 600 rpm on a magnetic stirrer using a Teflon covered magnetic bar having dimensions 7.9 mm×0.32 mm. The time taken by the water absorbent polymer for the vortex to arrest is an indication of the free swell absorbing rate of the water absorbent polymer.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

TECHNICAL ADVANCEMENTS:

The present disclosure, related to a process for preparing water absorbent polymers, has the following technical advancements:

A simple and economic process that eliminates the steps of separating, washing and grinding the water absorbent polymers, An energy efficient process wherein the slurry comprising relatively high amounts of water absorbed polymer is spray dried, Provides water absorbent polymer particles of uniform particle size distribution and essentially free from discoloration and contaminations, and Provides water absorbent polymer particles having high absorbency under load.

The numerical values given for various physical parameters, dimensions and quantities are only approximate values and it is envisaged that the values higher than the numerical value assigned to the physical parameters, dimensions and quantities fall within the scope of the invention and the claims unless there is a statement in the specification to the contrary.

While certain embodiments of the inventions have been described, these embodiments have been presented by way of example only, and are not intended to limit the scope of the inventions. Variations or modifications in the process or compound or formulation or combination of this invention, within the scope of the invention, may occur to those skilled in the art upon reviewing the disclosure herein. Such variations or modifications are well within the spirit of this invention. The accompanying claims and their equivalents are intended to cover such forms or modifications as would fall within the scope and spirit of the invention.

The invention claimed is:

1. A process for preparing a water absorbent polymer, said process comprising the following steps:
   i. preparing by inverse suspension polymerization, a slurry comprising polymer particles having water absorbed therein, wherein said polymer particles are present in an amount ranging between 40% and 55% of the total mass of the slurry;
   ii. homogenising the slurry with the help of heat and stirring, to obtain a homogeneous slurry; and
   iii. spray drying the homogeneous slurry in a spray drier to obtain water absorbent polymer particles.

2. The process as claimed in claim 1, wherein the method step of preparing the slurry comprises the following steps:
   (a) partially neutralizing an aqueous monomer solution of a pre-determined concentration by an alkali solution of a pre-determined concentration, to obtain a partially neutralized aqueous monomer solution;
   (b) adding a pre-determined weight proportion of at least one cross-linking agent and at least one free radical initiator to the partially neutralized aqueous monomer solution, to obtain a resultant solution;
   (c) mixing at least one organic solvent with at least one dispersing agent under continuous stirring, at a pre-determined temperature, to obtain a non-aqueous mixture; and
   (d) dispersing said resultant solution drop by drop into the non-aqueous mixture under continuous stirring at a temperature ranging from 55 to 110° C. for a time period varying from 60 to 180 minutes to obtain the slurry.

3. The process as claimed in claim 2, wherein the monomer includes at least one monomer selected from the group consisting of acrylic acid, methacrylic acid, sodium acrylate, potassium acrylate and acrylamide.

4. The process as claimed in claim 2, wherein the cross-linking agent includes at least one compound selected from the group consisting of N,N'-methylenebisacrylamide, ethylene glycol diacrylate, polyethylene glycol diacrylate, ethylene glycol dimethacrylate, polyethylene glycol dimethacrylate, glycerol triacrylate, glycerol trimethacrylate, trimethylolpropane trimethacrylate, trimethylolpropane triacrylate, and triglycol diacrylate.

5. The process as claimed in claim 2, wherein the free radical initiator is at least one compound selected from the group consisting of potassium persulfate, sodium persulfate, ammonium persulfate, alkali metal salts, sulfites, thiosulfates, ascorbates, ferrites and combinations thereof.

6. The process as claimed in claim 2, wherein the organic solvent includes at least one solvent selected from the group consisting of cyclohexane, N-hexane, N-heptane and toluene.

7. The process as claimed in claim 1, wherein the step of homogenizing the slurry in method step (ii) is carried out at a temperature ranging between 40° C. and 50° C.

8. The process as claimed in claim 1, wherein the inlet and outlet temperature of the spray drier is in the range of 70 to 220° C. and 70 to 140° C., respectively.

9. The process as claimed in claim 1, wherein the spray drying of the homogeneous slurry is carried out at a feed rate varying between 0.5 to 1.5 kg/hr aspirator speed varying between 1300 and 2800 rpm, and under vacuum varying between m −70 and −170 mm of water.

10. The process as claimed in claim 1, wherein the spray drying of the homogeneous slurry is carried out using nitrogen as a drying medium.

11. The process as claimed in claim 1, wherein the water absorbent polymer obtained is a copolymer.

* * * * *